United States Patent
Maness et al.

(10) Patent No.: US 10,027,994 B2
(45) Date of Patent: Jul. 17, 2018

(54) INTERACTIVE AUDIO METADATA HANDLING

(71) Applicant: DTS, Inc., Calabasas, CA (US)

(72) Inventors: Phillip Lee Maness, Thousand Oaks, CA (US); Mark Rogers Johnson, Pasadena, CA (US)

(73) Assignee: DTS, INC., Calabasas, CA (US)

( * ) Notice: Subject to any disclaimer, the term of this patent is extended or adjusted under 35 U.S.C. 154(b) by 0 days.

(21) Appl. No.: 15/078,945

(22) Filed: Mar. 23, 2016

(65) Prior Publication Data
US 2017/0280169 A1  Sep. 28, 2017

(51) Int. Cl.
*H04N 7/173* (2011.01)
*H04N 21/233* (2011.01)
*H04N 21/61* (2011.01)

(52) U.S. Cl.
CPC ....... *H04N 21/233* (2013.01); *H04N 21/6125* (2013.01)

(58) Field of Classification Search
CPC combination set(s) only.
See application file for complete search history.

(56) References Cited

U.S. PATENT DOCUMENTS

| | | | |
|---|---|---|---|
| 8,719,869 B2 | 5/2014 | Kudelski et al. | |
| 2007/0101249 A1* | 5/2007 | Lee | H04S 7/30 715/203 |
| 2015/0025664 A1* | 1/2015 | Cory | H04S 7/30 700/94 |
| 2015/0042887 A1 | 2/2015 | Schanin et al. | |
| 2016/0029140 A1* | 1/2016 | Mehta | G10L 19/008 381/307 |

* cited by examiner

*Primary Examiner* — Mulugeta Mengesha
(74) *Attorney, Agent, or Firm* — Craig Fischer; Jonas Hodges; Arent Fox LLP

(57) ABSTRACT

A method and apparatus for processing object-based audio signals for reproduction through a playback system is provided. The apparatus receives a plurality of object-based audio signals in at least one audio frame. In addition, the apparatus receives at least one audio object command associated with at least one object-based audio signal of the plurality of object-based audio signals. In addition, the apparatus processes the at least one object-based audio signal based on the received at least one audio object command. Further, the apparatus renders a set of object-based audio signals of the plurality of object-based audio signals to a set of output signals based on the at least one audio object command. The at least one audio frame may be received from one of a set top box, an OD player, or a television. The apparatus may be an AV receiver or a television.

50 Claims, 12 Drawing Sheets

INTERACTIVE AUDIO METADATA HANDLING

BACKGROUND

Field

The present disclosure relates generally to audio processing/handling, and more particularly, to interactive audio metadata processing/handling.

Background

A source device, such as a set-top box or an optical disk (OD) player, may send a coded audio stream to a sink device, such as an audio video (AV) receiver or a television. If a user would like to modify the audio stream (e.g., to modify a volume associated with an audio object in the audio stream, to add/remove audio objects in the audio stream), the source device may decode the audio stream, modify the audio stream accordingly, and then recode the audio stream to send to the sink device. Alternative methods for modifying an audio stream are needed.

SUMMARY

In an aspect of the disclosure, a method and an apparatus for processing object-based audio signals for reproduction through a playback system is provided. The apparatus receives a plurality of object-based audio signals in at least one audio frame. In addition, the apparatus receives at least one audio object command associated with at least one object-based audio signal of the plurality of object-based audio signals. In addition, the apparatus processes the at least one object-based audio signal based on the received at least one audio object command. Further, the apparatus renders a set of object-based audio signals of the plurality of object-based audio signals to a set of output signals based on the at least one audio object command.

In an aspect of the disclosure, a method and an apparatus for processing object-based audio signals for reproduction through a playback system is provided. The apparatus receives user selection information indicating at least one audio object command associated with at least one object-based audio signal. In addition, the apparatus obtains the at least one audio object command based on the received user selection information. In addition, the apparatus receives a plurality of object-based audio signals. Further, the apparatus sends the at least one audio object command with the received plurality of object-based audio signals.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, components, circuits, steps, processes, algorithms, elements, etc.

As discussed supra, a source device, such as a set-top box (STB) (also referred to as a set-top unit (STU) or integrated receiver/decoder (IRD)) or an OD player, may send a coded audio stream to a sink device, such as an AV receiver or a television. If a user would like to modify the audio stream, such as to modify a volume of an audio object in the audio stream and/or to add/remove an audio object from the audio stream, the source device may decode the audio stream, modify the audio stream accordingly, and then recode the audio stream to send to the sink device. With respect to user interactivity, modification of the audio stream may be more efficient if handled by the sink device rather than the source device.

Figure 1:
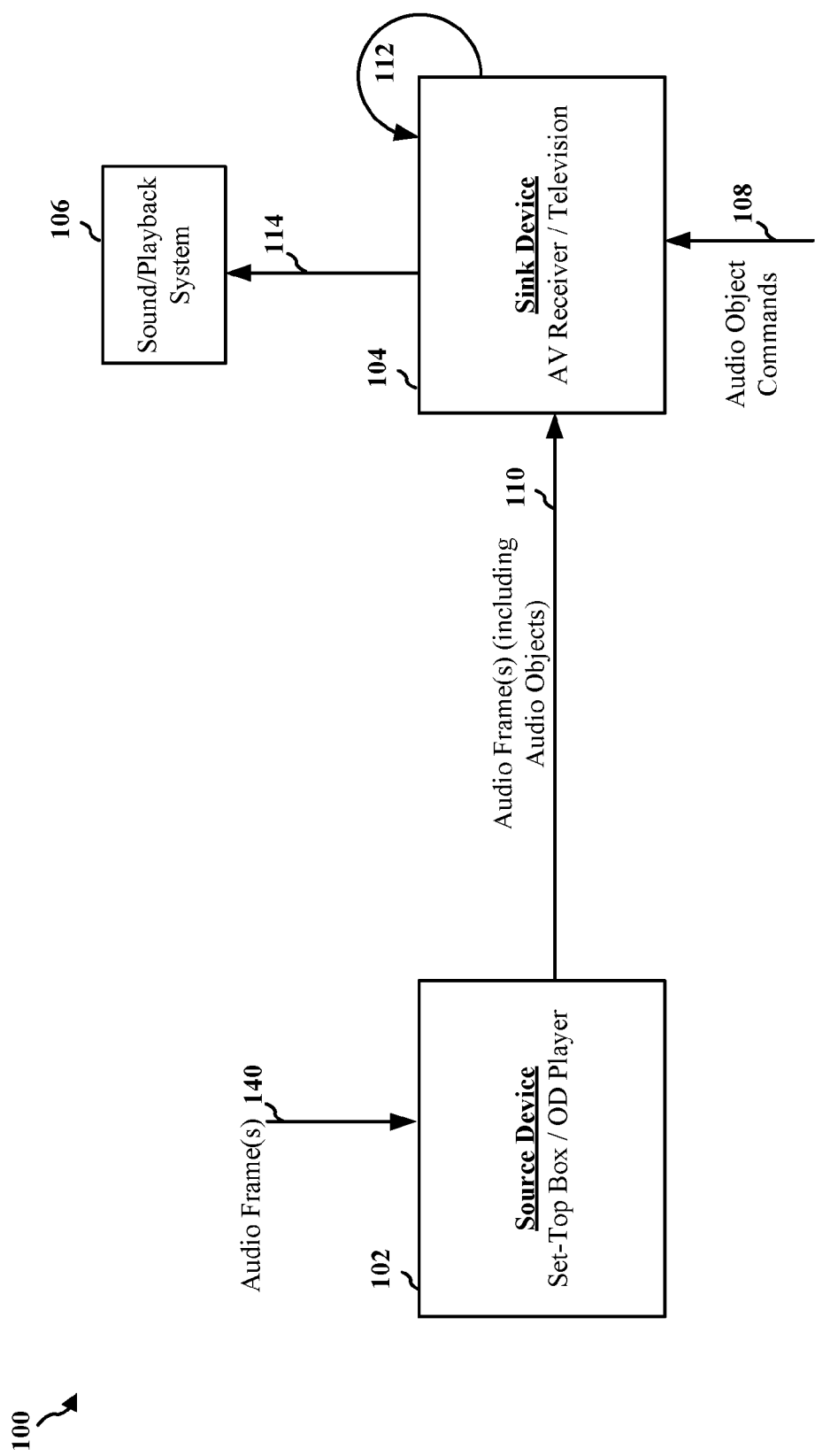
FIG. 1 is a block diagram for illustrating a first method associated with interactive audio metadata handling/processing.

FIG. 1 is a block diagram 100 for illustrating a first method associated with interactive audio metadata handling/processing. As shown in FIG. 1, a sink device 104, which may be an AV receiver, a television, or the like, receives audio object commands 108. In addition, the sink device 104 receives one or more audio frames 110 including audio objects (also referred to as object-based audio signals) from a source device 102. The sink device 104 may receive the audio frame(s) 110 periodically once a time period T (e.g., T may be approximately 10.67 ms). The source device 102 may be an STB or an OD player, for example. Alternatively, the source device 102 may be a mobile phone, a tablet, a streaming stick, a media personal computer (PC), or other source device. The source device 102 receives audio objects in one or more audio frames 140 and provides the received audio objects in one or more audio frames 110 to the sink device 104. The sink device 104 decodes the audio objects received in the audio frame(s) 110 and processes 112 one or more of the decoded audio objects based on the received audio object commands 108. The sink device 104 may perform additional processing (e.g., amplification) on the audio objects and may subsequently render/generate audio signals for the channels 114 of a sound/playback system 106. Subsequently, the sink device 104 sends the processed audio signals 114 to the sound/playback system 106. The sound/playback system 106 (e.g., loudspeaker) converts the received electrical audio signals into corresponding sounds.

An audio object is one or more audio waveforms with dynamic or static object specific metadata that describes certain characteristics of the waveforms. An audio object is normally associated with a particular object, such as particular dialog, a sound effect, particular instruments, or the like. The characteristics may include positional location in three-dimensional (3D) space at a given point in time, measured loudness, the nature of the audio object (such as an instrument, effect, music, background, or dialog), dialog language, how to display the audio object, and metadata in the form of instructions on how to process, to render, or to playback the audio object. Within an audio stream including a set of audio frames, there may be hundreds to thousands of different audio objects. One audio frame may include a subset of such audio objects, depending on which audio objects may be rendered for playback within the audio frame. The audio objects are not necessarily mapped to a specific channel. The sink device 104 may process the audio objects individually. Subsequently, in a rendering process, the AV receiver may map the audio objects to channels corresponding to the sound/playback system 106 by converting and/or mixing particular audio objects for each of the channels.

The audio object commands 108 may include commands associated with modifying a volume of an audio object, relocating an object spatially (e.g., see infra in relation to FIG. 6), turning audio objects on/off, adding/removing/replacing audio objects, adjusting listener location/orientation in relation to a loudspeaker/playback configuration, or otherwise, adjusting parameters, configurations, or attributes associated with an audio object. In one aspect, an audio object may include audio waveform data and object metadata associated with the audio waveform data. The audio object commands 108 may include one or more commands associated with modifying the object metadata associated with the audio waveform data.

Figure 2:
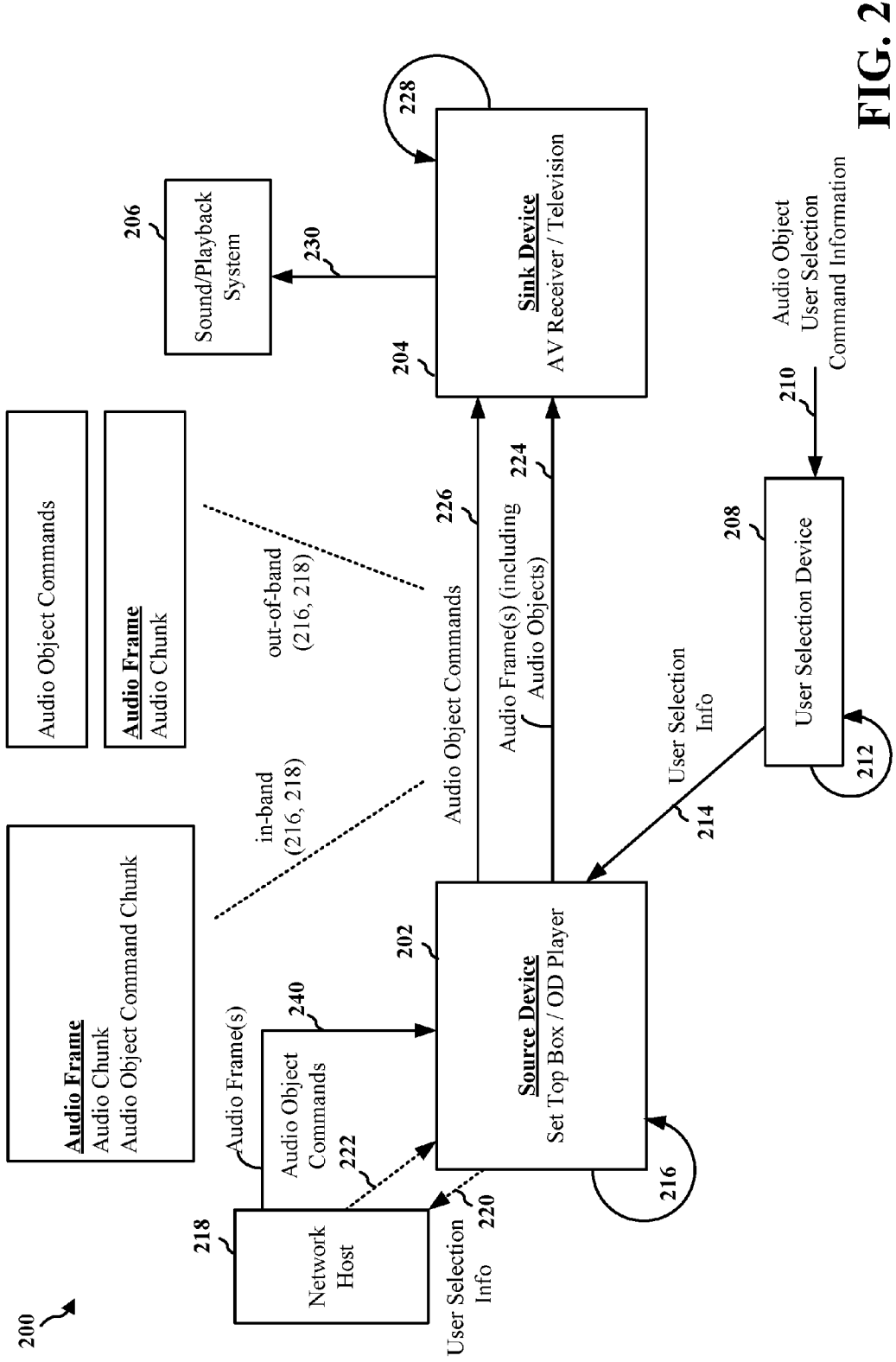
FIG. 2 is a block diagram for illustrating a second method associated with interactive audio metadata handling/processing.

FIG. 2 is a block diagram 200 for illustrating a second method associated with interactive audio metadata handling/processing. As shown in FIG. 2, a user selection device 208 may receive audio object user selection command information 210. The user selection device 208 may receive the audio object user selection command information 210 from a user, such as through an application and/or interface provided on the user selection device 208. The user selection device 208 processes 212 the audio object user selection command information 210 to generate user selection information 214 for a source device 202. The source device 202 may be an STB or an OD player, for example. Alternatively, the source device 202 may be a mobile phone, a tablet, a streaming stick, a media PC, or other source device. In a first configuration, the source device 202 generates audio object commands based on the received user selection information 214. In a second configuration, the source device 202 provides the user selection information 220 to a network host 218, which generates corresponding audio object commands 222, and provides the generated audio object commands 222 to the source device 202. Once the source device 202 has obtained (e.g., generated and/or received) audio object commands corresponding to the user selection information 214 and/or 220, the source device 202 may prepare 216 to send to a sink device 204 the audio object commands along with audio objects received from the network host 218 in one or more audio frames 240. The sink device 204 may be an AV receiver and/or television. The source device 202 may also determine in which audio frame(s) to include the audio object commands, as the source device 202 may receive audio object commands for audio objects that are to be sent by the source device 202 to the sink device 204 at a subsequent time.

In a first configuration in which the audio object commands are sent in-band with an audio chunk, the source device 202 may append the audio object commands as an audio object command chunk after a coded/compressed audio chunk within the audio frame(s). In such a configuration, the source device 202 may send the audio chunk (in 224) and the audio object command chunk 226 together in one or more audio frames 224. As such, while arrows 226, 224 are shown as separate arrows, the audio object commands and audio objects are sent together, concurrently in the same frequency band, and within the same audio frame(s) 224. In a second configuration in which the audio object commands are sent out-of-band from an audio chunk, the source device 202 may send the audio object commands 226 and the audio frame(s) 224 separately in different frequency bands to the sink device 204.

Upon receiving the audio frame(s) 224 including a plurality of audio objects and one or more audio object commands 226, the sink device 204 may process 228 the audio objects based on the one or more audio object commands 226. Subsequently, after processing one or more audio objects based on one or more audio object commands, the sink device 204 renders/maps audio objects to various channels 230 for playback by the sound/playback system 206.

Referring again to FIG. 2, in a first configuration, the user selection device 208 may be a separate stand-alone device that is separate from the source device 202 and the sink device 204, such as a cell phone, tablet, STB remote control, OD player remote control, or other device for receiving user input associated with audio object commands. In a second configuration, the user selection device 208 and the source device 202 may be the same device. That is, the source device 202 may itself provide mechanisms for receiving user input associated with the audio object commands. In a third configuration, the user selection device 208 and the television may be the same device. In such a configuration, the sink device 204 may be an AV receiver, and the television may itself provide mechanisms for receiving user input associated with audio object commands (e.g., through a television remote control, touch screen display, or the like).

Figure 3:
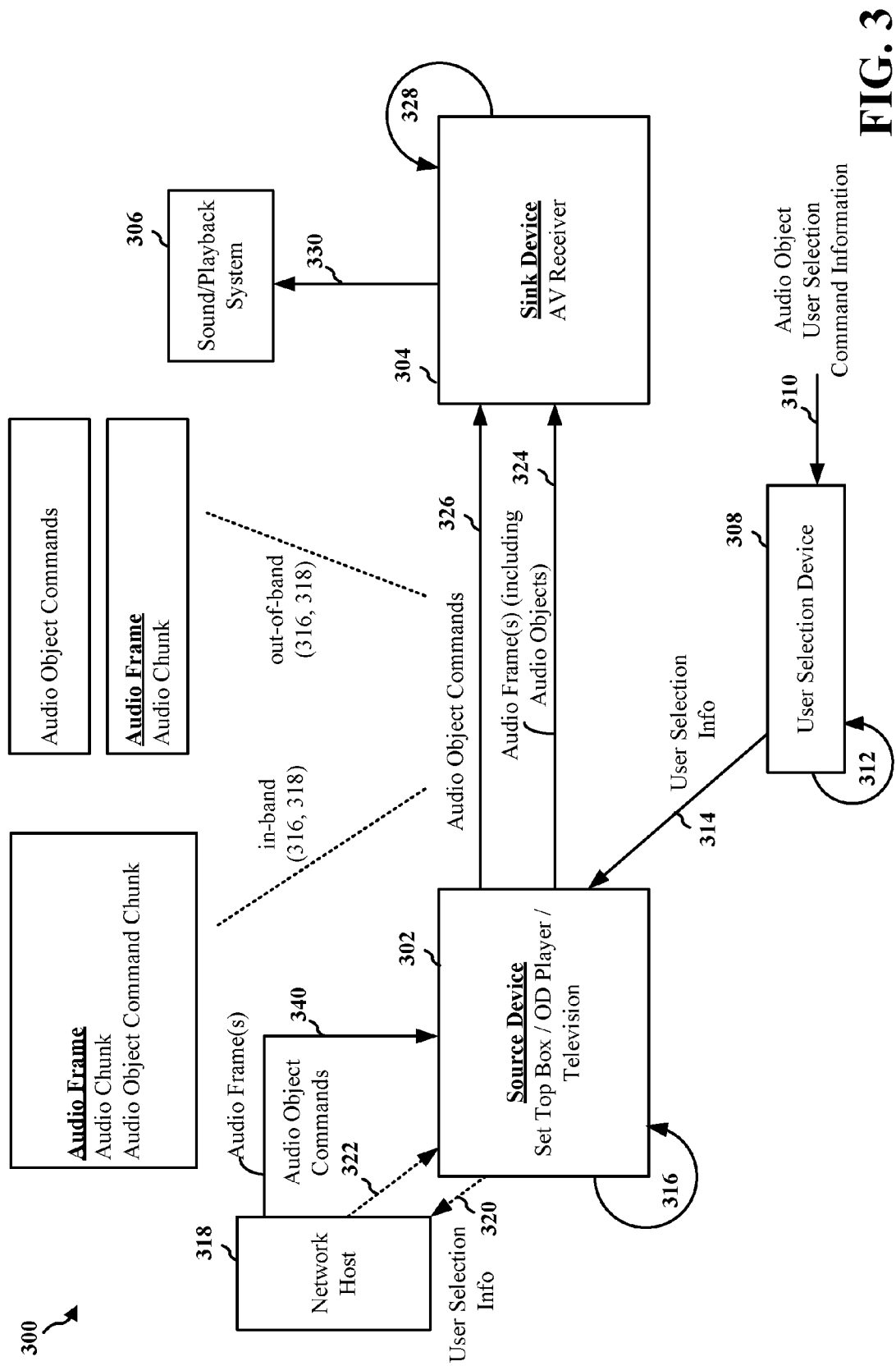
FIG. 3 is a block diagram for illustrating a third method associated with interactive audio metadata handling/processing.

FIG. 3 is a block diagram 300 for illustrating a third method associated with interactive audio metadata handling/processing. As shown in FIG. 3, a user selection device 308 may receive audio object user selection command information 310. The user selection device 308 may receive the audio object user selection command information 310 from a user, such as through an application and/or interface provided on the user selection device 308. The user selection device 308 processes 312 the audio object user selection command information 310 to generate user selection information 314 for a source device 302. The source device 302 may be an STB, an OD player, or a television, for example.

Alternatively, the source device 302 may be a mobile phone, a tablet, a streaming stick, a media PC, or other source device. In a first configuration, the source device 302 generates audio object commands based on the received user selection information 314. In a second configuration, the source device 302 provides the user selection information 320 to a network host 318, which generates corresponding audio object commands 322, and provides the generated audio object commands 322 to the source device 302. Once the source device 302 has obtained (e.g., generated and/or received) audio object commands corresponding to the user selection information 314 and/or 320, the source device 302 may prepare 316 to send to a sink device 304 the audio object commands along with audio objects received from the network host 318 in one or more audio frames 340. The sink device 304 may be an AV receiver. The source device 302 may also determine in which audio frame(s) to include the audio object commands, as the source device 302 may receive audio object commands for audio objects that are to be sent by the source device 302 to the sink device 304 at a subsequent time.

In a first configuration in which the audio object commands are sent in-band with an audio chunk, the source device 302 may append the audio object commands as an audio object command chunk after a coded/compressed audio chunk within the audio frame(s). In such a configuration, the source device 302 may send the audio chunk (in 324) and the audio object command chunk 326 together in one or more audio frames 324. As such, while arrows 326, 324 are shown as separate arrows, the audio object commands and audio objects are sent together, concurrently in the same frequency band, and within the same audio frame(s) 324. In a second configuration in which the audio object commands are sent out-of-band from an audio chunk, the source device 302 may send the audio object commands 326 and the audio frame(s) 324 separately in different frequency bands to the sink device 304.

Upon receiving the audio frame(s) 324 including a plurality of audio objects and one or more audio object commands 326, the sink device 304 may process 328 the audio objects based on the one or more audio object commands 326. Subsequently, after processing one or more audio objects based on one or more audio object commands, the sink device 304 renders/maps audio objects to various channels 330 for playback by the sound/playback system 306.

Referring again to FIG. 3, in a first configuration, the user selection device 308 may be a separate stand-alone device that is separate from the source device 302 and the sink device 304, such as a cell phone, tablet, STB remote control, OD player remote control, television remote control, or other device for receiving user input associated with audio object commands. In a second configuration, the user selection device 308 and the source device 302 may be the same device. That is, the source device 302 may itself provide mechanisms for receiving user input associated with the audio object commands.

Figure 4:
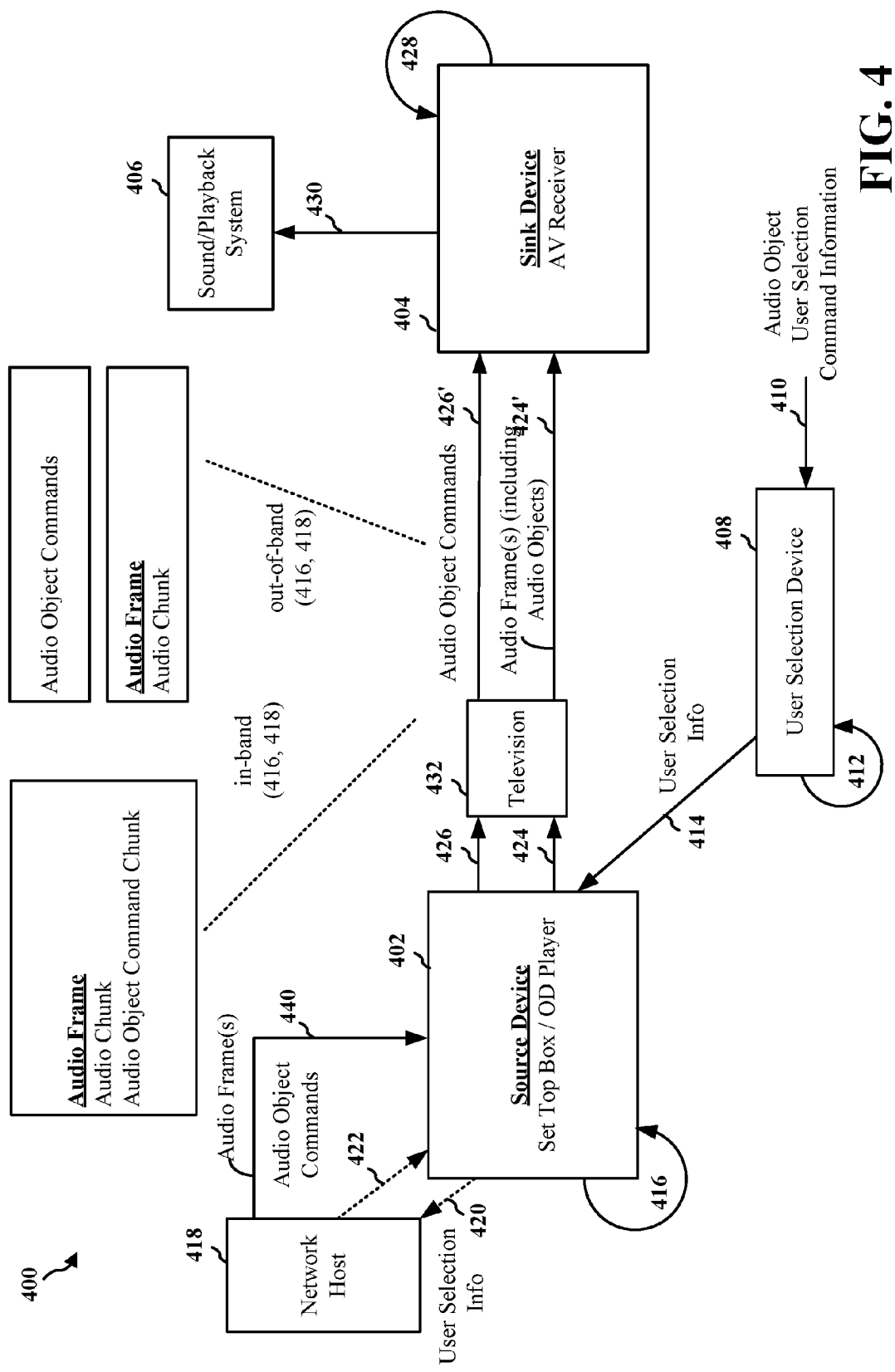
FIG. 4 is a block diagram for illustrating a fourth method associated with interactive audio metadata handling/processing.

FIG. 4 is a block diagram 400 for illustrating a fourth method associated with interactive audio metadata handling/processing. As shown in FIG. 4, a user selection device 408 may receive audio object user selection command information 410. The user selection device 408 may receive the audio object user selection command information 410 from a user, such as through an application and/or interface provided on the user selection device 408. The user selection device 408 processes 412 the audio object user selection command information 410 to generate user selection information 414 for a source device 402. The source device 402 may be an STB or an OD player, for example. Alternatively, the source device 402 may be a mobile phone, a tablet, a streaming stick, a media PC, or other source device. In a first configuration, the source device 402 generates audio object commands based on the received user selection information 414. In a second configuration, the source device 402 provides the user selection information 420 to a network host 418, which generates corresponding audio object commands 422, and provides the generated audio object commands 422 to the source device 402. Once the source device 402 has obtained (e.g., generated and/or received) audio object commands corresponding to the user selection information 414 and/or 420, the source device 402 may prepare 416 to send to a television 432 the audio object commands along with audio objects received from the network host 418 in one or more audio frames 440. The source device 402 may also determine in which audio frame(s) to include the audio object commands, as the source device 402 may receive audio object commands for audio objects that are to be sent by the source device 402 to the sink device 404 at a subsequent time.

In a first configuration in which the audio object commands are sent in-band with an audio chunk, the source device 402 may append the audio object commands as an audio object command chunk after a coded/compressed audio chunk within the audio frame(s). In such a configuration, the source device 402 may send the audio chunk (in 424) and the audio object command chunk 426 together in one or more audio frames 424. As such, while arrows 426, 424 are shown as separate arrows, the audio object commands and audio objects are sent together, concurrently in the same frequency band, and within the same audio frame(s) 424. In a second configuration in which the audio object commands are sent out-of-band from an audio chunk, the source device 402 may send the audio object commands 426 and the audio frame(s) 424 separately in different frequency bands to the television 432.

The television 432 receives the audio object commands and the audio objects, and forwards the audio object commands and audio objects to a sink device 404. The sink device 404 may be an AV receiver. The television 432 may forward the audio object commands and audio objects in-band or out-of-band depending on how the television 432 received the audio object commands and audio objects. For example, if the television 432 receives the audio object commands and audio objects together in-band in one or more audio frames from the source device 402, the television 432 may forward the audio object commands and the audio objects together in-band in one or more audio frames to the sink device 404. For another example, if the television 432 receives the audio object commands and the audio objects separately out-of-band from the source device 402, the television 432 may forward the audio object commands and the audio objects separately out-of-band to the sink device 404.

Upon receiving the audio frame(s) 424 including a plurality of audio objects and one or more audio object commands 426, the sink device 404 may process 428 the audio objects based on the one or more audio object commands 426. Subsequently, after processing one or more audio objects based on one or more audio object commands, the sink device 404 renders/maps audio objects to various channels 430 for playback by the sound/playback system 406.

Referring again to FIG. 4, in a first configuration, the user selection device 408 may be a separate stand-alone device that is separate from the source device 402 and the sink device 404, such as a cell phone, tablet, STB remote control, OD player remote control, or other device for receiving user input associated with audio object commands. In a second configuration, the user selection device 408 and the source device 402 may be the same device. That is, the source device 402 may itself provide mechanisms for receiving user input associated with the audio object commands.

Figure 5:
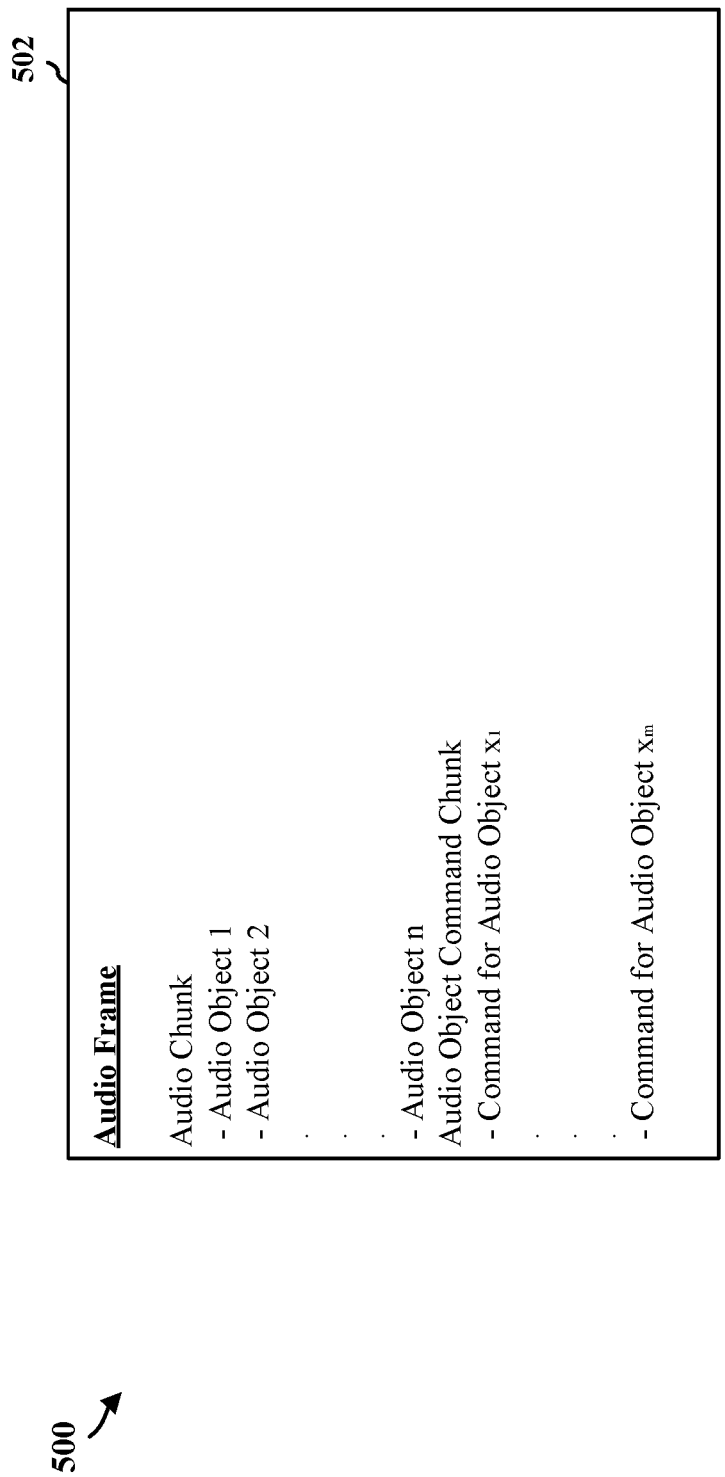
FIG. 5 is a diagram illustrating an audio frame when an audio object command chunk is in-band with an audio chunk in the audio frame.

FIG. 5 is a diagram 500 illustrating an audio frame when an audio object command chunk is in-band with an audio chunk in the audio frame. As shown in FIG. 5, an audio frame 502 includes an audio chunk and an audio object command chunk. The audio chunk includes a plurality n of audio objects, where n is a subset of the total number of audio objects available within an audio stream. For example, an audio stream may include audio for a full-length movie. Such audio stream may include thousands to tens of thousands of audio objects, if not more. The audio stream may include 500 k or more audio frames. One audio frame in particular may carry n audio objects depending on which audio objects may be rendered for playback in the audio frame. The audio object command chunk may include m audio object commands $x_1, x_2, \ldots, x_m$, where $m \geq 0$. An audio object command $x_i$ may correspond to one or more of the n audio objects. For example, the audio object command $x_1$ may be a command for changing a volume associated with one or more audio objects. For another example, the audio object command $x_1$ may be a command for replacing one audio object with another audio object (e.g., during a sporting event, to replace the English speaking announcer with a Spanish speaking announcer). For yet another example, the audio object command $x_1$ may be a command for including an audio object for processing, rendering, and playback, such as when a user would like another audio stream (e.g., phone call) overlaid with the initial audio stream (e.g., full-length movie).

In one configuration, the audio object command may apply to the corresponding audio object(s) until the command is revoked. In another configuration, the audio object command may apply to the corresponding audio object(s) for a particular time period. In such a configuration, the audio object command may include the time period for which the audio object command applies.

The diagram 500 illustrates an audio frame that includes n audio objects and m audio object commands. As discussed supra, one or more audio frames may be received for a concurrent time period (e.g., 10.67 ms) corresponding to one audio frame. Assuming q audio frames are received for a concurrent time period, where the $i^{th}$ audio frame includes $n_i$ audio objects and $m_i$ audio object commands, such concurrent time period may be associated with $n_1+n_2+ \ldots +n_q$ audio objects and $m_1+m_2+ \ldots +m_q$ audio object commands.

Figure 6:
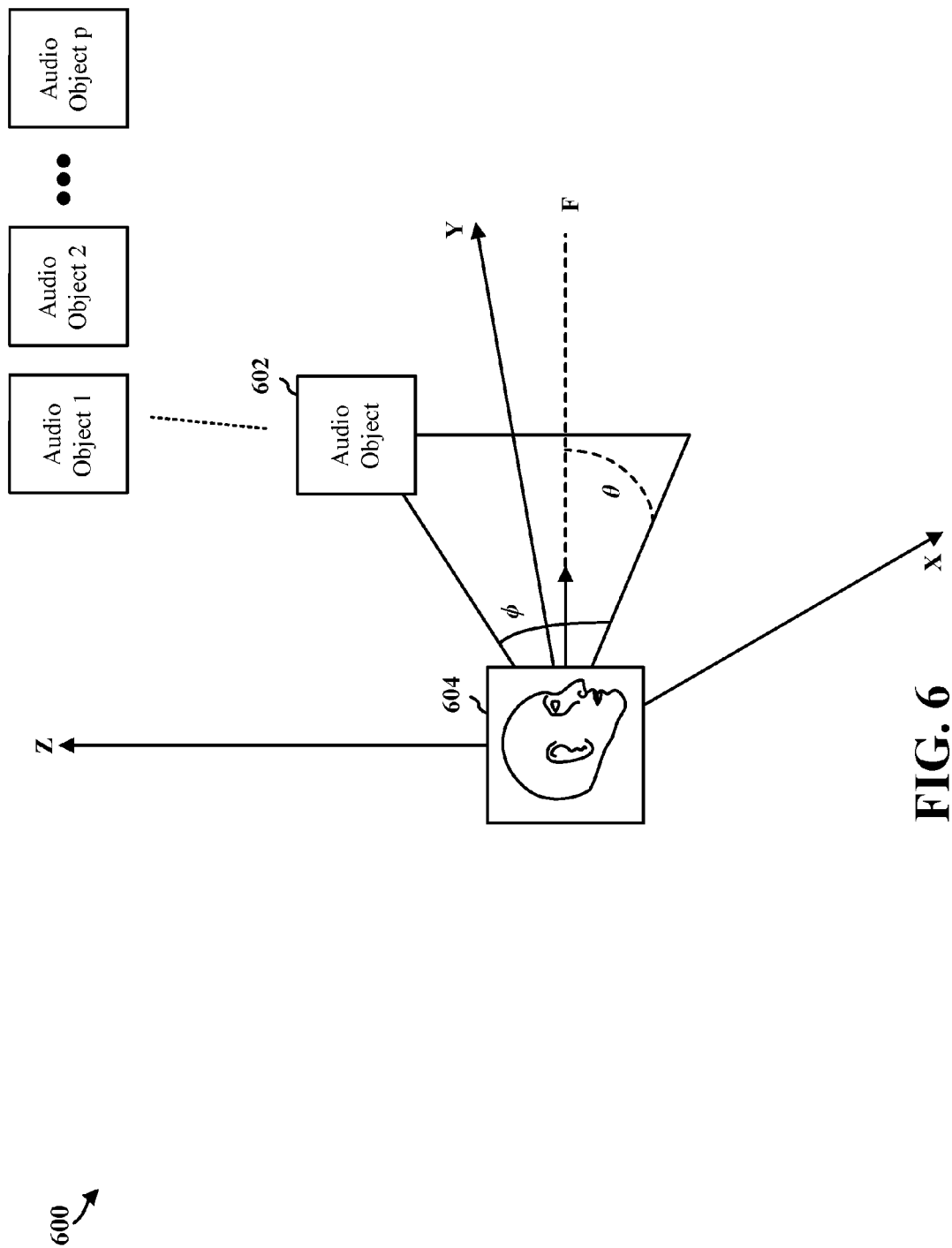
FIG. 6 is a diagram for illustrating audio objects in relation to a listener's head and modification of such audio objects through audio object commands.

FIG. 6 is a diagram 600 for illustrating audio objects in relation to a listener's head and modification of such audio objects through audio object commands. An audio object 602 may be "located" in a particular position relative to a listener's head 604. As shown in FIG. 6, the audio object 602 is located an angle θ from a forward direction F of the listener's head 604 along the xy plane, and an angle φ from the forward direction F of the listener's head 604 in the z direction. The expression "located" means that a listener having a head position as illustrated by the listener's head position 604 may perceive the audio object 602, when rendered and played through a sound/playback system, as being at such spatial location relative to the listener's head 604. An audio object command may change the position/spatial location in 3D space of an audio object by providing information indicating new parameters for θ and φ relative to a given listener orientation, or by providing information indicating changes in θ and φ relative to a given listener orientation. Further, an audio object command may replace the audio object 602 with another audio object. For example, as illustrated in FIG. 6, the audio object 602 is audio object 1. An audio object command may replace the audio object 1 with any one of the audio objects 2 through p. For a specific example, assuming the audio stream is a sporting event, the p audio objects may be dialog from play callers in different languages, and a user may select one of the p audio objects depending on to what language the listener would like to listen.

Rendering is the processing of object-based audio signals to generate output audio signals based on audio object metadata (e.g., θ, φ), and other parameters). For example, rendering may be performed through a multi-dimensional audio (MDA) reference renderer, such as a vector base amplitude panning (VBAP) renderer. VBAP is a method for positioning virtual sources in a particular direction using a particular setup of multiple loudspeakers (e.g., International Telecommunication Union (ITU) 5.1/7.1 speaker layout configuration or some other speaker layout configuration). When rendering, the MDA/VBAP renderer renders a set of object-based audio signals to a set of output signals based on one or more audio object commands and based on audio object metadata (e.g., θ, φ), and other parameters) associated with the object-based audio signals.

Figure 7:
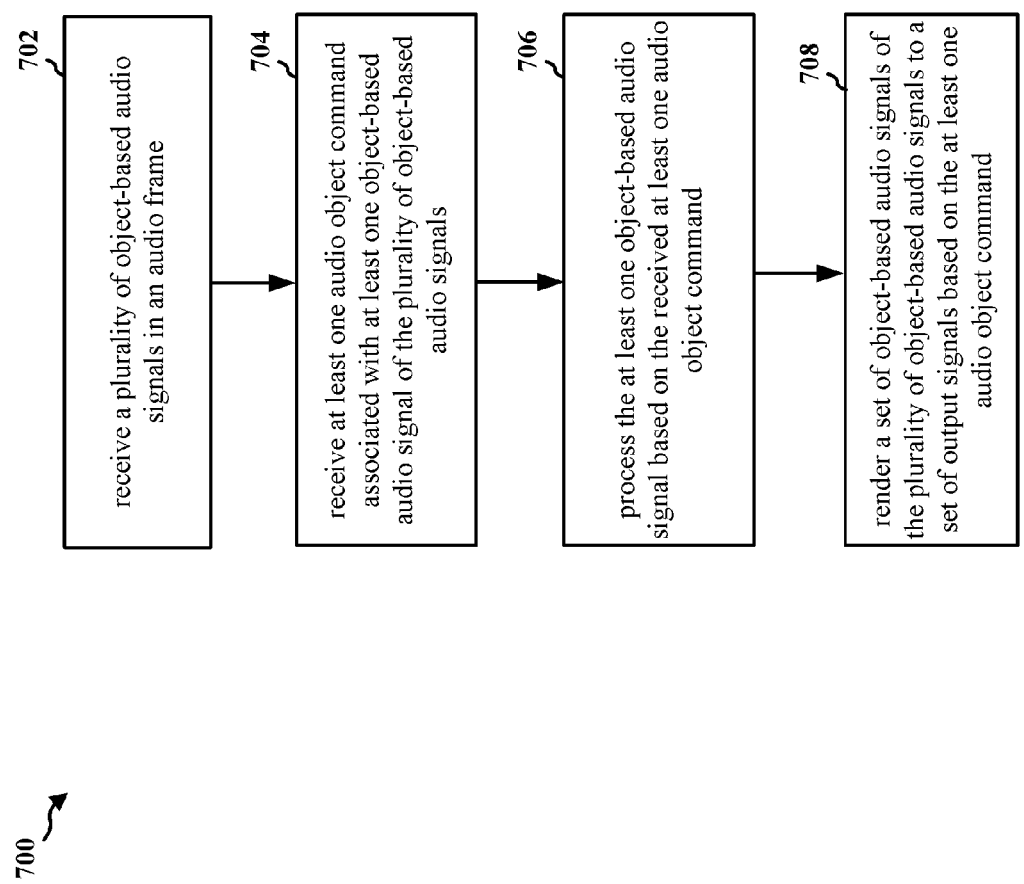
FIG. 7 is a flow chart of a method of processing object-based audio signals for reproduction through a playback system.

FIG. 7 is a flow chart 700 of a method of processing object-based audio signals for reproduction through a playback system. The method may be performed by an apparatus, such as an AV receiver or a television. At 702, the apparatus receives a plurality of object-based audio signals in at least one audio frame. The apparatus may receive the at least one audio frame from one of a set top box, an OD player, or a television. Alternatively, the apparatus may receive the at least one audio frame from a mobile phone, a tablet, a streaming stick, a media PC, or other source device. For example, referring to FIGS. 1-4, the sink device 104, 204, 304, 404 receives a plurality of object-based audio signals in audio frame(s) 110, 224, 324, 424. At 704, the apparatus receives at least one audio object command associated with at least one object-based audio signal of the plurality of object-based audio signals. For example, referring to FIGS. 1-4, the sink device 104, 204, 304, 404 receives at least one audio object command 108, 226, 326, 426' associated with at least one object-based audio signal of the plurality of object-based audio signals. At 706, the apparatus processes the at least one object-based audio signal based on the received at least one audio object command. For example, referring to FIGS. 1-4, the sink device 104, 204, 304, 404 processes 112, 228, 328, 428 the at least one object-based audio signal based on the received at least one audio object command 108, 226, 326, 426'. At 708, the apparatus renders a set of object-based audio signals of the plurality of object-based audio signals to a set of output signals based on the at least one audio object command. For example, referring to FIGS. 1-4, the sink device 104, 204, 304, 404 renders a set of object-based audio signals of the plurality of object-based audio signals to a set of output signals 114, 230, 330, 430 based on the at least one audio object command 108, 226, 326, 426'.

For a specific example, referring to FIGS. 2-4, the sink device 104, 204, 304, 404 may receive a plurality of object-based audio signals in at least one audio frame. The object-based audio signals may include object-based audio signals $s_1, s_2, \ldots, s_n$. The sink device 104, 204, 304, 404 may also receive audio object commands $x_1, x_2, \ldots, x_m$ associated with a subset S of the object-based audio signals $s_1, s_2, \ldots, s_n$. For example, the audio object command $x_1$ may specify to replace the object-based audio signal $s_1$ with the object-based audio signal $s_2$ when rendering. For another example, the audio object command $x_2$ may specific to change the volume of the object-based audio signal $s_3$. The sink device 104, 204, 304, 404 may subsequently process the object-based audio signals $s_1, s_2, s_3$ based on the received audio object commands $x_1, x_2$. The sink device 104, 204, 304, 404 may process the object-based audio signals $s_1, s_2, s_3$ by removing the object-based audio signal $s_1$, adding the object-based audio signal $s_2$, and changing a volume of the object-based audio signal $s_3$. Subsequently, the sink device 104, 204, 304, 404 may render a set of object-based audio signals (which at least includes $s_2$ and $s_3$, but not $s_1$) of the object-based audio signals $s_1, s_2, \ldots, s_n$ to a set of output signals based on the audio object commands $x_1, x_2, \ldots, x_m$.

In one configuration, at 704, the at least one audio object command is received in the audio frame(s) with the plurality of object-based audio signals. For example, as discussed supra in relation to FIGS. 2-4, audio object commands may be received in-band in the audio frame(s) with the object-based audio signals. In such a configuration, the at least one audio object command may be appended to an end of the plurality of object-based audio signals in the audio frame(s).

In one configuration, at 704, the at least one audio object command is received separately from the audio frame(s) including the plurality of object-based audio signals. The at least one audio object command may be received before/after the audio frame(s) or concurrently with the audio frame(s) including the plurality of object-based audio signals. For example, as discussed supra in relation to FIGS. 2-4, audio object commands may be received out-of-band from the audio frame(s) with the object-based audio signals.

In one configuration, each object-based audio signal of the plurality of object-based audio signals includes audio waveform data and object metadata associated with the audio waveform data. In such a configuration, to process the at least one object-based audio signal based on the received at least one audio object command, the apparatus may modify the object metadata of the at least one object-based audio signal based on the at least one audio object command. For example, to process the at least one object-based audio signal, the apparatus may modify object metadata associated with audio waveform data to change a volume of the audio waveform data, to relocate a perceived spatial location associated with the audio waveform data, to add/remove the audio waveform data, to adjust a listener location/orientation in relation to a loudspeaker/playback configuration, or otherwise, to adjust parameters, configurations, or attributes associated with the audio waveform data.

In one configuration, at 706, to process the at least one object-based audio signal based on the received at least one audio object command, the apparatus may modify a volume associated with the at least one object-based audio signal, remove the at least one object-based audio signal from being rendered in the set of object-based audio signals, add the at least one object-based audio signal to being rendered in the set of object-based audio signals, replace a first object-based audio signal of the at least one object-based audio signal with a second object-based audio signal of the at least one object-based audio signal when rendering the set of object-based audio signals, modify a spatial location of the at least one object-based audio signal, or change a metadata/rendering attribute of the at least one object-based audio signal.

Figure 8:
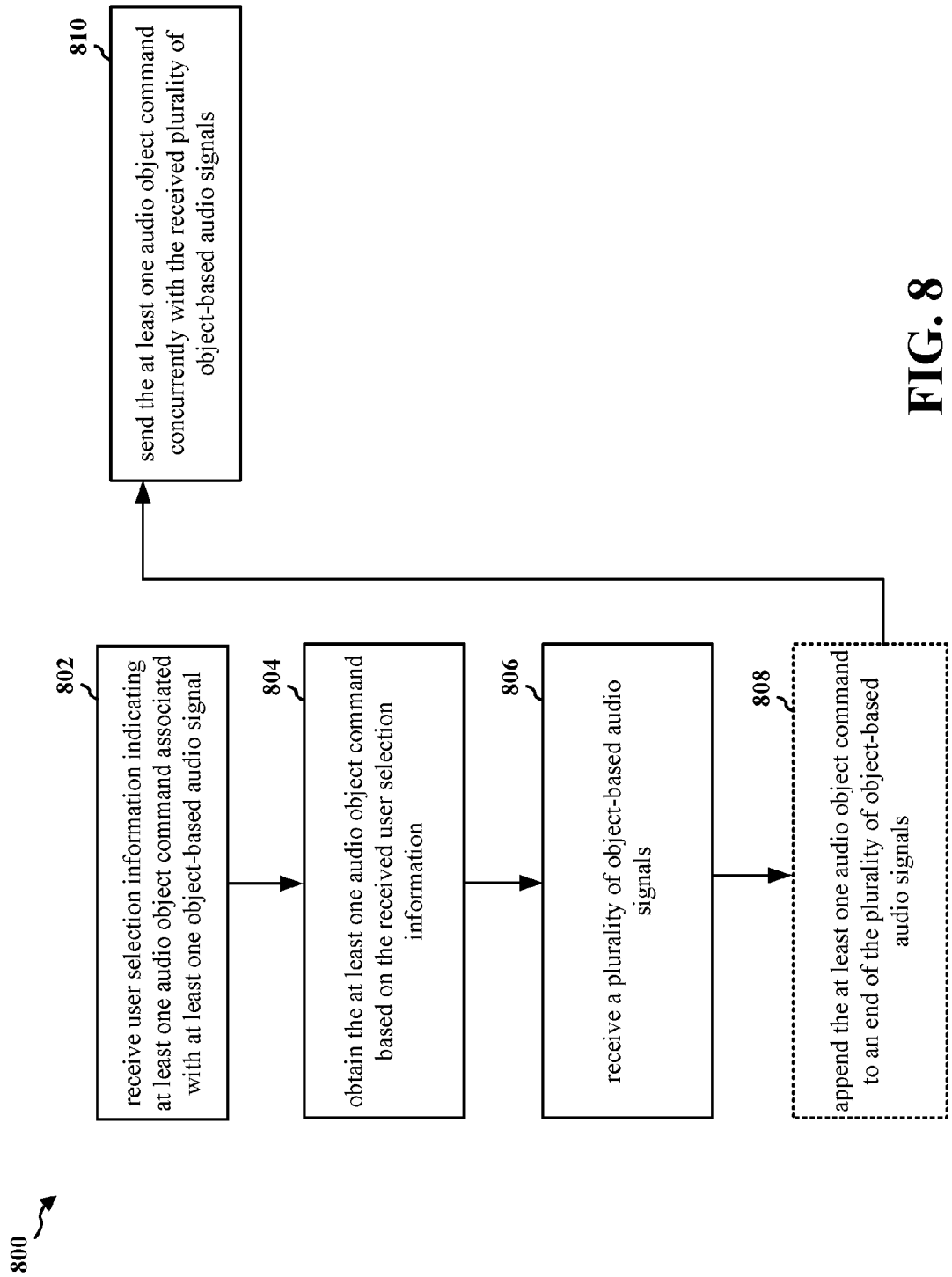
FIG. 8 is a flow chart of a method of processing object-based audio signals for reproduction through a playback system.

FIG. 8 is a flow chart 800 of a method of processing object-based audio signals for reproduction through a playback system. The method may be performed by an apparatus, such as a set top box, an OD player, or a television. At 802, the apparatus receives user selection information indicating at least one audio object command associated with at least one object-based audio signal. For example, referring to FIGS. 2-4, the source device 202, 302, 402 receives user selection information 214, 314, 414 indicating at least one audio object command associated with at least one object-based audio signal. At 804, the apparatus obtains the at least one audio object command based on the received user selection information. For example, referring to FIGS. 2-4, in one configuration, to obtain the at least one audio object command, the source device 202, 302, 402 may generate the at least one audio object command based on the received user selection information 214, 314, 414. For another example, in one configuration, to obtain the at least one audio object command, the source device 202, 302, 402 may send the user selection information 220, 320, 420 to a network host 218, 318, 418. In addition, in response, the source device 202, 302, 402 may receive the at least one audio object command 222, 322, 422 from the network host 218, 318, 418. At 806, the apparatus receives a plurality of object-based audio signals. For example, referring to FIGS. 2-4, the apparatus may receive a plurality of object-based audio signals from the network host 218, 318, 418 in at least one audio frame 240, 340, 440. When sending the at least one audio object command in-band with the plurality of object-based audio signals, at 808, the source device 202, 302, 402 may append the at least one audio object command to an end of the plurality of object-based audio signals. In such a configuration, the source device 202, 302, 402 may send the at least one audio object command and the plurality of object-based audio signals in at least one audio frame. At 810, the apparatus sends (serially or in parallel/concurrently) the at least one audio object command with the received plurality of object-based audio signals. For example, referring to FIGS. 2-4, the source device 202, 302, 402 sends the at least one audio object command 226, 326, 426 with the plurality of object-based audio signals 224, 324, 424.

In one configuration, the at least one audio object command is sent in at least one audio frame with the plurality of object-based audio signals. For example, as discussed supra in relation to FIGS. 2-4, audio object commands 226, 326, 426 may be sent in-band with the object-based audio signals within at least one audio frame 224, 324, 424. In one configuration, the at least one audio object command 226, 326, 426 is sent separately from at least one audio frame including the plurality of object-based audio signals. For example, as discussed supra, audio object commands 226, 326, 426 may be sent out-of-band from the audio frame(s) 224, 324, 424 including the object-based audio signals. The source device 202, 302, 402, may send the at least one audio object command and the plurality of object-based audio signals to one of an AV receiver or a television.

Figure 9:
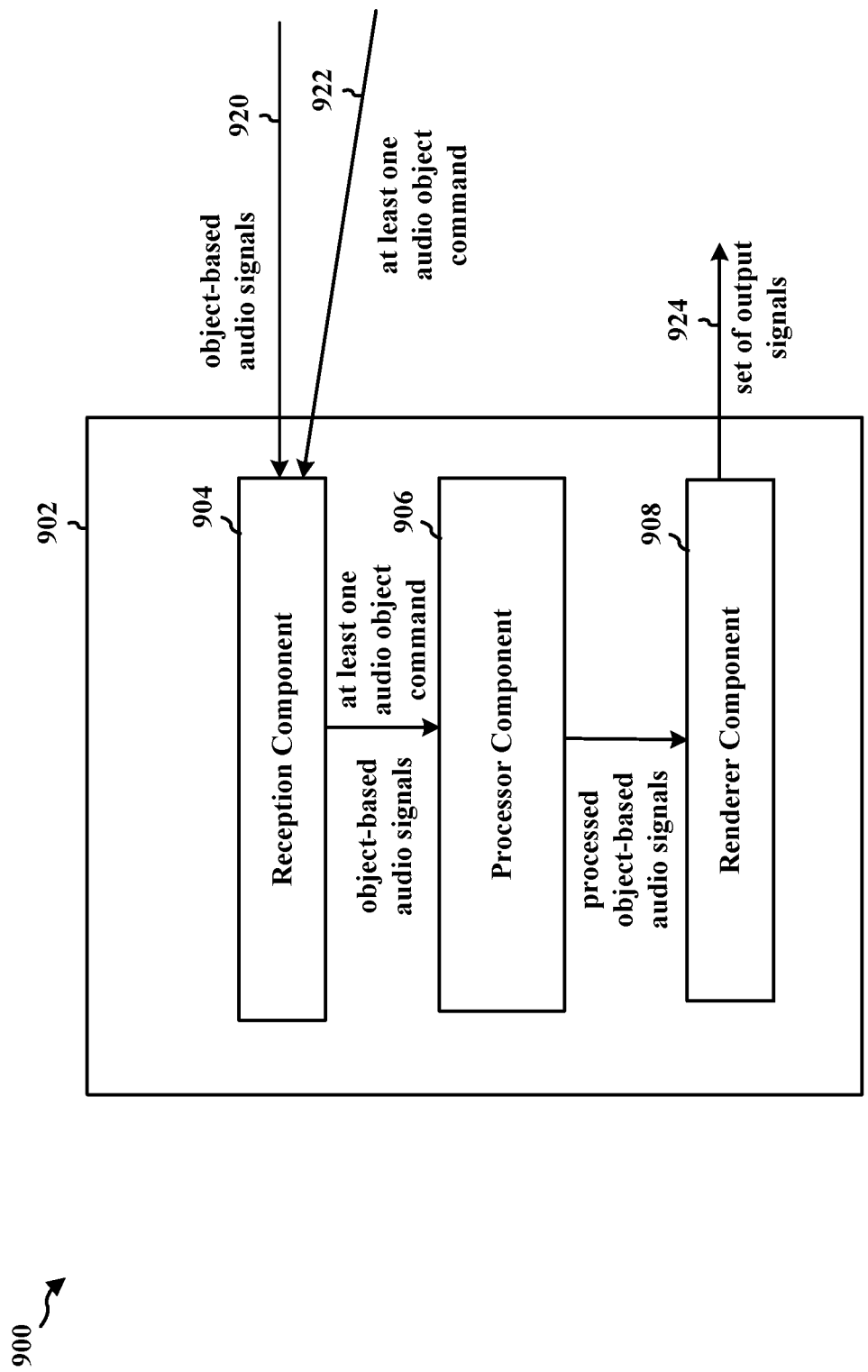
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 processes object-based audio signals for reproduction through a playback system. The apparatus 902 includes a reception component 904, a processor component 906, and a renderer component 908. The reception component 904 is configured to receive a plurality of object-based audio signals 920 in at least one audio frame. In addition, the reception component 904 is configured to receive at least one audio object command 922 associated with at least one object-based audio signal of the plurality of object-based audio signals 920. The reception component 904 is configured to provide the object-based audio signals 920 and the at least one audio object command 922 to a processor component 906. The processor component 906 is configured to process the at least one object-based audio signal based on the received at least one audio object command 922. The processor component 906 is configured to provide the processed object-based audio signals to a renderer component 908. The renderer component 908 is configured to render a set of object-based audio signals of the plurality of object-based audio signals to a set of output signals 924 based on the at least one audio object command. The set of output signals 924 may be provided to a sound/playback system (e.g., to drive loudspeakers).

The at least one audio object command may be received in the audio frame(s) with the plurality of object-based audio signals. The at least one audio object command may be appended to an end of the plurality of object-based audio signals in the audio frame(s). The at least one audio object command may be received separately from the audio frame(s) including the plurality of object-based audio signals. Each object-based audio signal of the plurality of object-based audio signals may include audio waveform data and object metadata associated with the audio waveform data. To process the at least one object-based audio signal based on the received at least one audio object command, the processor component 906 may be configured to modify the object metadata of the at least one object-based audio signal based on the at least one audio object command. To process the at least one object-based audio signal based on the received at least one audio object command, the processor component 906 may be configured to modify a volume associated with the at least one object-based audio signal, to remove the at least one object-based audio signal from being rendered in the set of object-based audio signals, to add the at least one object-based audio signal to being rendered in the set of object-based audio signals, to replace a first object-based audio signal of the at least one object-based audio signal with a second object-based audio signal of the at least one object-based audio signal when rendering the set of object-based audio signals, to modify a spatial location of the at least one object-based audio signal, or to change a metadata/rendering attribute of the at least one object-based audio signal. The audio frame(s) may be received from one of a set top box, an OD player, or a television. The apparatus may be an AV receiver or a television.

Figure 10:
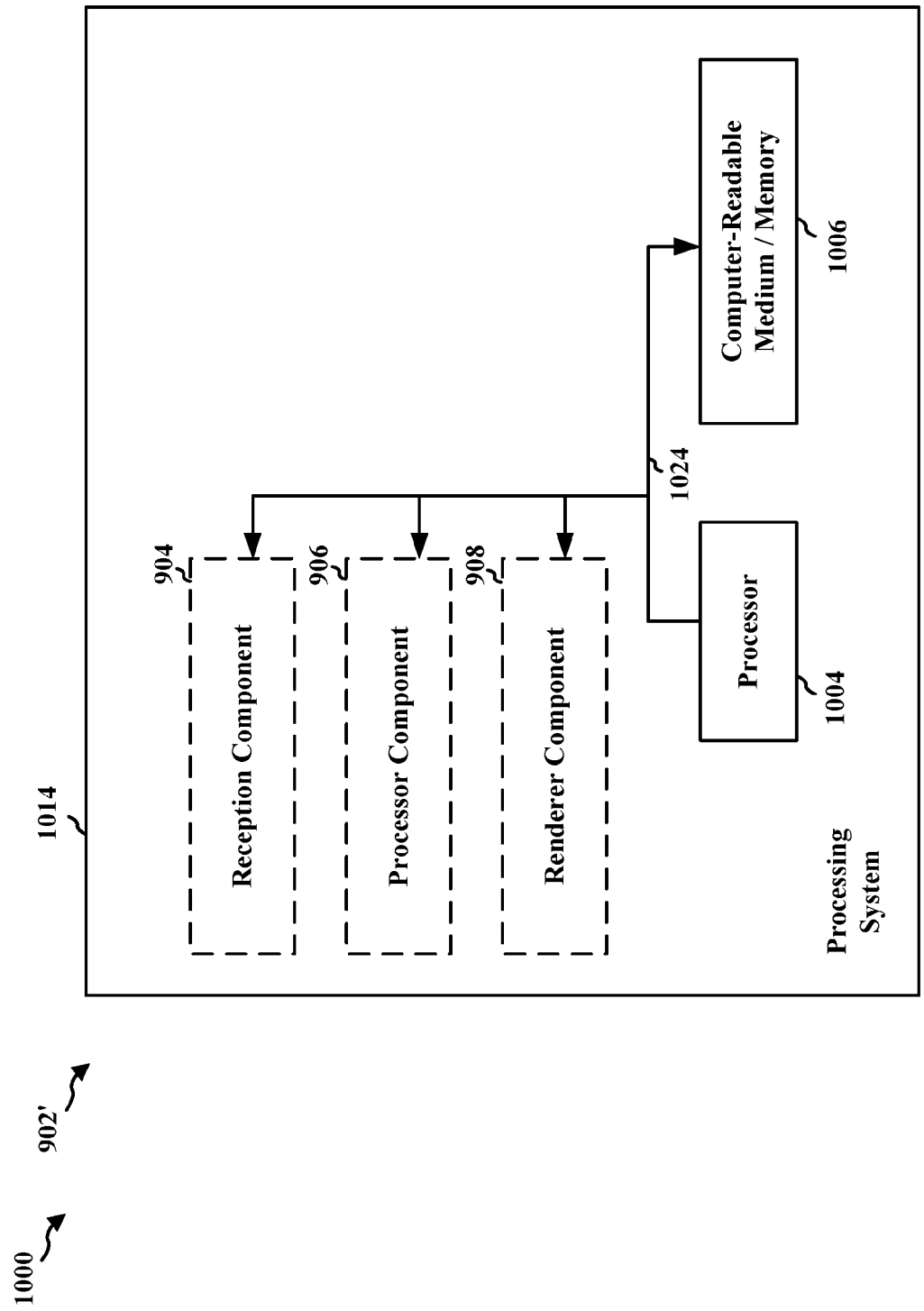
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof.

In one configuration, an apparatus for processing object-based audio signals for reproduction through a playback system is provided. The apparatus includes means for receiving a plurality of object-based audio signals in at least one audio frame. In addition, the apparatus includes means for receiving at least one audio object command associated with at least one object-based audio signal of the plurality of object-based audio signals. In addition, the apparatus includes means for processing the at least one object-based audio signal based on the received at least one audio object command. Further, the apparatus includes means for rendering a set of object-based audio signals of the plurality of object-based audio signals to a set of output signals based on the at least one audio object command. In one configuration, each object-based audio signal of the plurality of object-based audio signals includes audio waveform data and object metadata associated with the audio waveform data. In such a configuration, the means for processing the at least one object-based audio signal based on the received at least one audio object command is configured to modify the object metadata of the at least one object-based audio signal based on the at least one audio object command. In one configuration, the means for processing the at least one object-based audio signal based on the received at least one audio object command is configured to perform at least one of modify a volume associated with the at least one object-based audio signal, remove the at least one object-based audio signal from being rendered in the set of object-based audio signals, add the at least one object-based audio signal to being rendered in the set of object-based audio signals, replace a first object-based audio signal of the at least one object-based audio signal with a second object-based audio signal of the at least one object-based audio signal when rendering the set of object-based audio signals, modify a spatial location of the at least one object-based audio signal, or change a metadata/rendering attribute of the at least one object-based audio signal.

Figure 11:
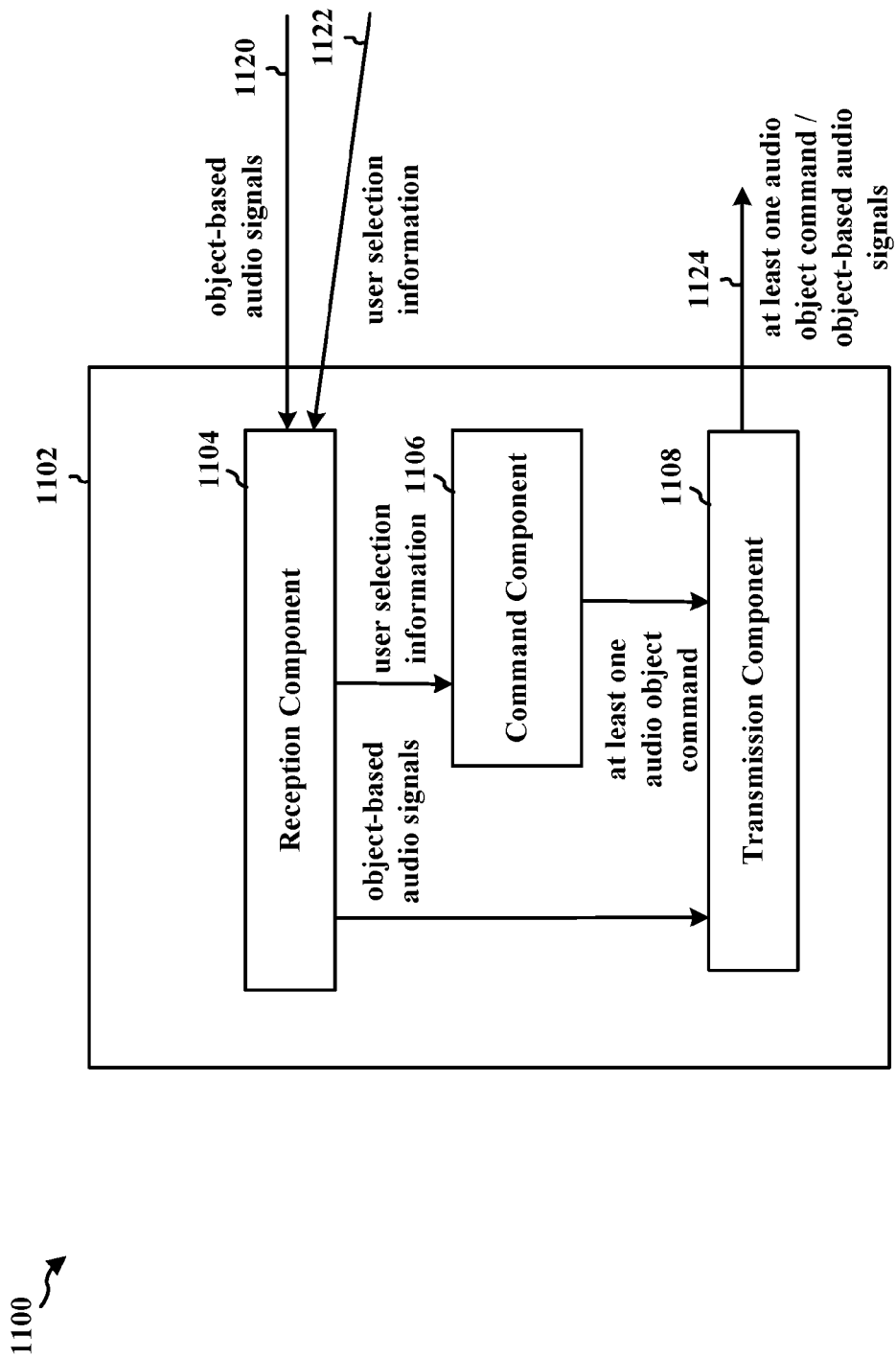
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus. The apparatus 1102 processes object-based audio signals for reproduction through a playback system. The apparatus 1102 includes a reception component 1104, a command component 1106, and a transmission component 1108. The reception component 1104 is configured to receive user selection information 1122 indicating at least one audio object command associated with at least one object-based audio signal. The command component 1106 is configured to obtain the at least one audio object command based on the received user selection information. The reception component 1104 is configured to receive a plurality of object-based audio signals 1120. The reception component 1104 is configured to provide the plurality of object-based audio signals 1120 to the transmission component 1108. The command component 1106 is configured to provide the at least one audio object command to the transmission component 1108. The transmission component 1108 is configured to send the at least one audio object command with the received plurality of object-based audio signals.

In one configuration, the transmission component 1108 is configured to append the at least one audio object command to an end of the plurality of object-based audio signals. In such a configuration, the at least one audio object command and the plurality of object-based audio signals are sent in at least one audio frame. The command component 1106 may be configured to obtain the at least one audio object command based on the received user selection information by generating the at least one audio object command based on the received user selection information. The command component 1106 may be configured to obtain the at least one audio object command based on the received user selection information by sending the received user selection information to a network host, and receiving the at least one audio object command from the network host. The at least one audio object command is based on the sent user selection information.

Figure 12:
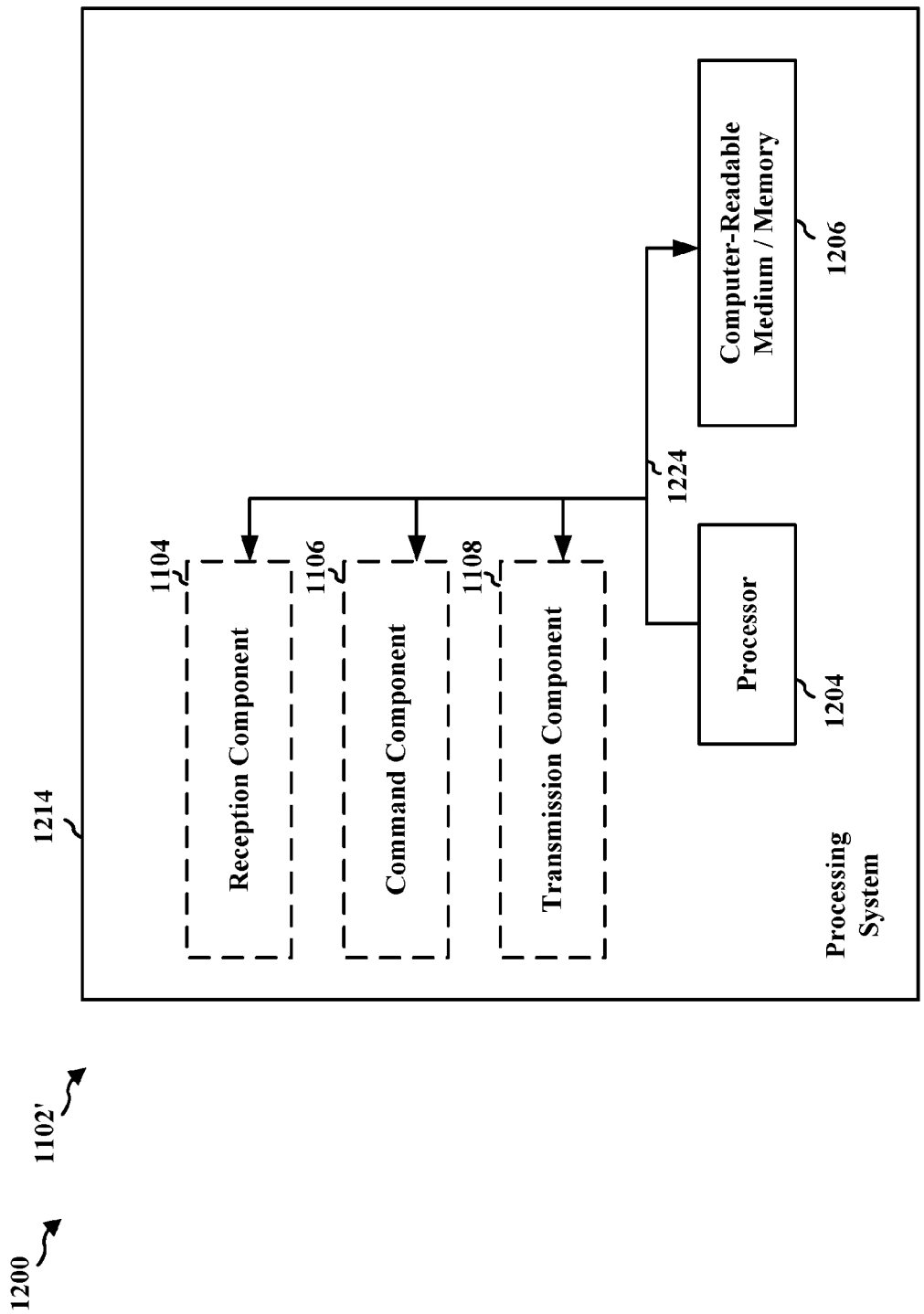
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof.

In one configuration, an apparatus for processing object-based audio signals for reproduction through a playback system is provided. The apparatus includes means for receiving user selection information indicating at least one audio object command associated with at least one object-based audio signal. The apparatus further includes means for obtaining the at least one audio object command based on the received user selection information. The apparatus further includes means for receiving a plurality of object-based audio signals. The apparatus further includes means for sending the at least one audio object command with the received plurality of object-based audio signals. The apparatus may further include means for appending the at least one audio object command to an end of the plurality of object-based audio signals. The at least one audio object command and the plurality of object-based audio signals may be sent in at least one audio frame. In one configuration, the means for obtaining the at least one audio object command based on the received user selection information is configured to generate the at least one audio object command based on the received user selection information. In one configuration, the means for obtaining the at least one audio object command based on the received user selection information is configured to send the received user selection information to a network host, and to receive the at least one audio object command from the network host, the at least one audio object command being based on the sent user selection information.

The various illustrative logical blocks, components, methods, and algorithm processes and sequences described in connection with the embodiments disclosed herein can be implemented as electronic hardware, computer software, or combinations of both. To clearly illustrate this interchangeability of hardware and software, various illustrative components, blocks, components, and process actions have been described supra generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the interactive audio metadata handling system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, an AV receiver, a television, an STB, and OD player, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a DSP, a very long instruction word (VLIW), or other micro-controller, or can be conventional CPUs having one or more processing cores, including specialized graphics processing unit (GPU)-based cores in a multi-core CPU.

The process actions of a method, process, or algorithm described in connection with the embodiments disclosed herein can be embodied directly in hardware, in a software component executed by a processor, or in any combination of the two. The software component can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program components, or other data. By way of example, and not limitation, computer readable media may comprise computer storage media and communication media.

Computer storage media includes, but is not limited to, computer or machine readable media or storage devices such as optical storage devices, Blu-ray discs (BD), digital versatile discs (DVDs), compact discs (CDs), floppy disks, tape drives, hard drives, optical drives, solid state memory devices, random-access memory (RAM) memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software component can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. Alternatively, the processor and the storage medium can reside as discrete components in a user terminal.

The phrase "non-transitory" as used in this document means "enduring or long-lived." The phrase "non-transitory computer-readable media" includes any and all computer-readable media, with the sole exception of a transitory, propagating signal. This includes, by way of example and not limitation, non-transitory computer-readable media such as register memory, processor cache, and RAM.

Retention of information such as computer-readable or computer-executable instructions, data structures, program components, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the interactive audio metadata handling system and method described herein, or portions thereof, may be stored, received, transmitted, or read from any desired combination of computer or machine readable media or storage devices and communication media in the form of computer executable instructions or other data structures.

Embodiments of the interactive audio metadata handling system and method described herein may be further described in the general context of computer-executable instructions, such as program components, being executed by a computing device. Generally, program components include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program components may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the interactive audio metadata handling system and method described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described supra. Rather, the specific features and acts described supra are disclosed as example forms of implementing the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of processing object-based audio signals for reproduction through a playback system, comprising:
   receiving, from an external device, a plurality of encoded object-based audio signals in at least one audio frame;
   receiving, from the external device, at least one audio object command associated with at least one object-based audio signal of the plurality of encoded object-based audio signals, wherein the at least one audio object command is not encoded;
   sending together, from the external device to the playback system, at least some of the plurality of encoded object-based audio signals and the at least one audio object command that is not encoded;
   processing the at least one object-based audio signal based on the received at least one audio object command; and
   rendering a set of object-based audio signals of the plurality of encoded object-based audio signals to a set of output signals based on the at least one audio object command.

2. The method of claim 1, wherein the at least one audio object command is received in the at least one audio frame with the plurality of encoded object-based audio signals.

3. The method of claim 2, wherein the at least one audio object command is appended to an end of the plurality of encoded object-based audio signals in the at least one audio frame.

4. The method of claim 1, wherein the at least one audio object command is received separately from the at least one audio frame including the plurality of encoded object-based audio signals.

5. The method of claim 1, wherein each object-based audio signal of the plurality of encoded object-based audio signals includes audio waveform data and object metadata associated with the audio waveform data, the processing the at least one object-based audio signal based on the received at least one audio object command comprising modifying the object metadata of the at least one object-based audio signal based on the at least one audio object command.

6. The method of claim 1, wherein the processing the at least one object-based audio signal based on the received at least one audio object command comprises at least one of:
   modifying a volume associated with the at least one object-based audio signal, removing the at least one object-based audio signal from being rendered in the set of object-based audio signals,
   adding the at least one object-based audio signal to being rendered in the set of object-based audio signals,
   replacing a first object-based audio signal of the at least one object-based audio signal with a second object-based audio signal of the at least one object-based audio signal when rendering the set of object-based audio signals,
   modifying a spatial location of the at least one object-based audio signal, or
   changing an attribute of the at least one object-based audio signal.

7. The method of claim 1, wherein the at least one audio frame is received from one of a set top box, an optical disk player, or a television.

8. The method of claim 1, wherein the method is performed by one of an audio video (AV) receiver or a television.

9. A method of processing object-based audio signals for reproduction through a playback system, comprising:
   receiving user selection information indicating at least one audio object command associated with at least one object-based audio signal;
   obtaining the at least one audio object command based on the received user selection information, wherein the at least one audio object command is not encoded;
   receiving a plurality of encoded object-based audio signals; and
   sending together the at least one audio object command that is not encoded with the received plurality of encoded object-based audio signals.

10. The method of claim 9, wherein the at least one audio object command is sent in at least one audio frame with the plurality of encoded object-based audio signals.

11. The method of claim 9, further comprising appending the at least one audio object command to an end of the plurality of encoded object-based audio signals, the at least one audio object command and the plurality of encoded object-based audio signals being sent in at least one audio frame.

12. The method of claim 9, wherein the at least one audio object command is sent separately from at least one audio frame including the plurality of encoded object-based audio signals.

13. The method of claim 9, wherein the obtaining the at least one audio object command based on the received user selection information comprises generating the at least one audio object command based on the received user selection information.

14. The method of claim 9, wherein the obtaining the at least one audio object command based on the received user selection information comprises:
sending the received user selection information to a network host; and
receiving the at least one audio object command from the network host, the at least one audio object command being based on the sent user selection information.

15. The method of claim 9, wherein the at least one audio object command and the plurality of encoded object-based audio signals are sent to one of an audio video (AV) receiver or a television.

16. The method of claim 9, wherein the method is performed by one of a set top box, an optical disk player, or a television.

17. An apparatus for processing object-based audio signals for reproduction through a playback system, comprising:
a memory; and
at least one processor coupled to the memory and configured to:
receive, from an external device, a plurality of encoded object-based audio signals in at least one audio frame;
receive, from the external device, at least one audio object command associated with at least one object-based audio signal of the plurality of encoded object-based audio signals, wherein the at least one audio object command is not encoded;
send together, from the external device to the playback system, at least some of the plurality of encoded object-based audio signals and the at least one audio object command that is not encoded;
process the at least one object-based audio signal based on the received at least one audio object command; and
render a set of object-based audio signals of the plurality of encoded object-based audio signals to a set of output signals based on the at least one audio object command.

18. The apparatus of claim 17, wherein the at least one audio object command is received in the at least one audio frame with the plurality of encoded object-based audio signals.

19. The apparatus of claim 18, wherein the at least one audio object command is appended to an end of the plurality of encoded object-based audio signals in the at least one audio frame.

20. The apparatus of claim 17, wherein the at least one audio object command is received separately from the at least one audio frame including the plurality of encoded object-based audio signals.

21. The apparatus of claim 17, wherein each object-based audio signal of the plurality of encoded object-based audio signals includes audio waveform data and object metadata associated with the audio waveform data, and wherein to process the at least one object-based audio signal based on the received at least one audio object command, the at least one processor is configured to modify the object metadata of the at least one object-based audio signal based on the at least one audio object command.

22. The apparatus of claim 17, wherein to process the at least one object-based audio signal based on the received at least one audio object command, the at least one processor is configured to perform at least one of:
modify a volume associated with the at least one object-based audio signal,
remove the at least one object-based audio signal from being rendered in the set of object-based audio signals,
add the at least one object-based audio signal to being rendered in the set of object-based audio signals,
replace a first object-based audio signal of the at least one object-based audio signal with a second object-based audio signal of the at least one object-based audio signal when rendering the set of object-based audio signals,
modify a spatial location of the at least one object-based audio signal, or
change an attribute of the at least one object-based audio signal.

23. The apparatus of claim 17, wherein the at least one audio frame is received from one of a set top box, an optical disk player, or a television.

24. The apparatus of claim 17, wherein the apparatus is one of an audio video (AV) receiver or a television.

25. An apparatus for processing object-based audio signals for reproduction through a playback system, comprising:
a memory; and
at least one processor coupled to the memory and configured to:
receive user selection information indicating at least one audio object command associated with at least one object-based audio signal;
obtain the at least one audio object command based on the received user selection information, wherein the at least one audio object command is not encoded;
receive a plurality of encoded object-based audio signals; and
send together the at least one audio object command that is not encoded with the received plurality of encoded object-based audio signals.

26. The apparatus of claim 25, wherein the at least one audio object command is sent in at least one audio frame with the plurality of encoded object-based audio signals.

27. The apparatus of claim 25, wherein the at least one processor is further configured to append the at least one audio object command to an end of the plurality of encoded object-based audio signals, the at least one audio object command and the plurality of encoded object-based audio signals being sent in at least one audio frame.

28. The apparatus of claim 25, wherein the at least one audio object command is sent separately from at least one audio frame including the plurality of encoded object-based audio signals.

29. The apparatus of claim 25, wherein to obtain the at least one audio object command based on the received user selection information, the at least one processor is configured to generate the at least one audio object command based on the received user selection information.

30. The apparatus of claim 25, wherein to obtain the at least one audio object command based on the received user selection information, the at least one processor is configured to:
send the received user selection information to a network host; and
receive the at least one audio object command from the network host, the at least one audio object command being based on the sent user selection information.

31. The apparatus of claim 25, wherein the at least one audio object command and the plurality of encoded object-based audio signals are sent to one of an audio video (AV) receiver or a television.

32. The apparatus of claim 25, wherein the apparatus is one of a set top box, an optical disk player, or a television.

33. An apparatus for processing object-based audio signals for reproduction through a playback system, comprising:
   means for receiving, from an external device, a plurality of encoded object-based audio signals in at least one audio frame;
   means for receiving, from the external device, at least one audio object command associated with at least one object-based audio signal of the plurality of encoded object-based audio signals, wherein the at least one audio object command is not encoded;
   means for sending together, from the external device to the playback system, at least some of the plurality of encoded object-based audio signals and the at least one audio object command that is not encoded;
   means for processing the at least one object-based audio signal based on the received at least one audio object command; and
   means for rendering a set of object-based audio signals of the plurality of object-based audio signals to a set of output signals based on the at least one audio object command.

34. The apparatus of claim 33, wherein the at least one audio object command is received in the at least one audio frame with the plurality of encoded object-based audio signals.

35. The apparatus of claim 34, wherein the at least one audio object command is appended to an end of the plurality of encoded object-based audio signals in the at least one audio frame.

36. The apparatus of claim 33, wherein the at least one audio object command is received separately from the at least one audio frame including the plurality of encoded object-based audio signals.

37. The apparatus of claim 33, wherein each object-based audio signal of the plurality of encoded object-based audio signals includes audio waveform data and object metadata associated with the audio waveform data, the means for processing the at least one object-based audio signal based on the received at least one audio object command being configured to modify the object metadata of the at least one object-based audio signal based on the at least one audio object command.

38. The apparatus of claim 33, wherein the means for processing the at least one object-based audio signal based on the received at least one audio object command is configured to perform at least one of:
   modify a volume associated with the at least one object-based audio signal,
   remove the at least one object-based audio signal from being rendered in the set of object-based audio signals,
   add the at least one object-based audio signal to being rendered in the set of object-based audio signals,
   replace a first object-based audio signal of the at least one object-based audio signal with a second object-based audio signal of the at least one object-based audio signal when rendering the set of object-based audio signals,
   modify a spatial location of the at least one object-based audio signal, or
   change an attribute of the at least one object-based audio signal.

39. The apparatus of claim 33, wherein the at least one audio frame is received from one of a set top box, an optical disk player, or a television.

40. The apparatus of claim 33, wherein the apparatus is one of an audio video (AV) receiver or a television.

41. An apparatus for processing object-based audio signals for reproduction through a playback system, comprising:
   means for receiving user selection information indicating at least one audio object command associated with at least one object-based audio signal;
   means for obtaining the at least one audio object command based on the received user selection information, wherein the at least one audio object command is not encoded;
   means for receiving a plurality of encoded object-based audio signals; and
   means for sending together the at least one audio object command that is not encoded with the received plurality of encoded object-based audio signals.

42. The apparatus of claim 41, wherein the at least one audio object command is sent in at least one audio frame with the plurality of encoded object-based audio signals.

43. The apparatus of claim 41, further comprising means for appending the at least one audio object command to an end of the plurality of encoded object-based audio signals, the at least one audio object command and the plurality of encoded object-based audio signals being sent in at least one audio frame.

44. The apparatus of claim 41, wherein the at least one audio object command is sent separately from at least one audio frame including the plurality of encoded object-based audio signals.

45. The apparatus of claim 41, wherein the means for obtaining the at least one audio object command based on the received user selection information is configured to generate the at least one audio object command based on the received user selection information.

46. The apparatus of claim 41, wherein the means for obtaining the at least one audio object command based on the received user selection information is configured to:
   send the received user selection information to a network host; and
   receive the at least one audio object command from the network host, the at least one audio object command being based on the sent user selection information.

47. The apparatus of claim 41, wherein the at least one audio object command and the plurality of encoded object-based audio signals are sent to one of an audio video (AV) receiver or a television.

48. The apparatus of claim 41, wherein the apparatus is one of a set top box, an optical disk player, or a television.

49. A non-transitory computer-readable medium storing computer executable code for processing object-based audio signals for reproduction through a playback system, the computer-readable medium comprising code to:
   receive, from an external device, a plurality of encoded object-based audio signals in at least one audio frame;
   receive, from the external device, at least one audio object command associated with at least one object-based audio signal of the plurality of encoded object-based audio signals, wherein the at least one audio object command is not encoded;
   send together, from the external device to the playback system, at least some of the plurality of encoded object-based audio signals and the at least one audio object command that is not encoded;
process the at least one object-based audio signal based on the received at least one audio object command; and
render a set of object-based audio signals of the plurality of object-based audio signals to a set of output signals based on the at least one audio object command.

50. A non-transitory computer-readable medium storing computer executable code for processing object-based audio signals for reproduction through a playback system, the computer-readable medium comprising code to:
receive user selection information indicating at least one audio object command associated with at least one object-based audio signal;
obtain the at least one audio object command based on the received user selection information, where in the as least one audio object command is not encoded;
receive a plurality of encoded object-based audio signals; and
send together the at least one audio object command that is not encoded with the received plurality of encoded object-based audio signals.

* * * * *